(12) United States Patent
Wootton

(10) Patent No.: US 8,175,951 B2
(45) Date of Patent: May 8, 2012

(54) AUTOMATED BID ASK SPREAD NEGOTIATIONS METHOD

(75) Inventor: James B. Wootton, Westerville, OH (US)

(73) Assignee: American Charter, LLC, Columbus, OH (US)

( * ) Notice: Subject to any disclaimer, the term of this patent is extended or adjusted under 35 U.S.C. 154(b) by 332 days.

(21) Appl. No.: 12/453,480

(22) Filed: May 12, 2009

(65) Prior Publication Data
US 2010/0293102 A1    Nov. 18, 2010

(51) Int. Cl.
*G06Q 40/00* (2012.01)
*G06Q 90/00* (2006.01)
*G06F 17/00* (2006.01)

(52) U.S. Cl. ............ 705/36 R; 705/500; 705/36 T
(58) Field of Classification Search ............ 705/1, 36, 705/500
See application file for complete search history.

(56) References Cited

U.S. PATENT DOCUMENTS

| | | | |
|---|---|---|---|
| 6,581,041 B1 | 6/2003 | Canney | |
| 6,684,196 B1 | 1/2004 | Mini et al. | |
| 7,096,196 B1 | 8/2006 | Karp et al. | |
| 2002/0016758 A1 | 2/2002 | Grigsby | |
| 2002/0069079 A1 | 6/2002 | Vega | |
| 2002/0072930 A1 | 6/2002 | Scites | |
| 2002/0178039 A1* | 11/2002 | Kennedy | 705/7 |
| 2003/0167232 A1* | 9/2003 | Linton | 705/44 |
| 2003/0233310 A1 | 12/2003 | Stavrovski | |
| 2004/0220816 A1 | 11/2004 | Brush | |
| 2004/0220823 A1 | 11/2004 | Brush et al. | |
| 2004/0220884 A1 | 11/2004 | Khan | |
| 2005/0015335 A1 | 1/2005 | Howard | |
| 2005/0171877 A1 | 8/2005 | Weiss | |
| 2005/0246271 A1* | 11/2005 | Erwin | 705/39 |
| 2006/0190396 A1* | 8/2006 | Winterhalder | 705/39 |
| 2006/0206417 A1* | 9/2006 | Selby | 705/38 |
| 2007/0050290 A1 | 3/2007 | Heitner et al. | |
| 2007/0088581 A1* | 4/2007 | Treacy, Jr. | 705/4 |
| 2007/0088582 A1* | 4/2007 | Treacy, Jr. | 705/4 |
| 2007/0118486 A1 | 5/2007 | Burchetta et al. | |
| 2007/0203825 A1* | 8/2007 | Hanifin et al. | 705/38 |
| 2007/0208646 A1* | 9/2007 | Treacy, Jr. | 705/36 T |

(Continued)

FOREIGN PATENT DOCUMENTS

GB    2 386 994 A    10/2003

(Continued)

OTHER PUBLICATIONS

Wootton, Jim, "Real Estate Gift, How Your Church Can Acquire Major Gifts Without Badgering Donors", American Charter, 2006, selected pages.*

(Continued)

*Primary Examiner* — Alexander Kalinowski
*Assistant Examiner* — Ryan D Donlon
(74) *Attorney, Agent, or Firm* — Richard C. Litman

(57) ABSTRACT

The automated bid ask spread negotiations method is a computer process and system for negotiating transactions combining a bargain sale strategy with the normal negotiating process. The system effectively adds a bonus to the package of benefits, thereby closing the gap from a previous nominal price asked and bid, but payable to a charity of the seller's choice, over a long term and at a favorable rate of interest, at the same time, providing a tax deduction for the seller, as well as an interest deduction for the buyer of the asset or services.

5 Claims, 6 Drawing Sheets

SALE OF MANUFACTURING CORPORATION

U.S. PATENT DOCUMENTS

| | | | |
|---|---|---|---|
| 2007/0208656 | A1 | 9/2007 | Feaver et al. |
| 2008/0300991 | A1 | 12/2008 | Openiano |
| 2010/0332418 | A1* | 12/2010 | Treacy, Jr. .................... 705/500 |

FOREIGN PATENT DOCUMENTS

| | | |
|---|---|---|
| JP | 2001-195451 A | 7/2001 |
| JP | 2002-109276 A | 4/2002 |
| JP | 2004-355582 A | 12/2004 |

OTHER PUBLICATIONS

Meade, Janet A. "Tax-Effective Charitable Donations of Debt-Encumbered Real Estate", Taxes—The Tax Magazine, Nov. 2006.*

"Charitable Installment Bargain Sale Procedure", Trust Councelors Network, Aug. 27, 2008.*

"Tar River Land Converancy, Conservation Options", Jul. 5, 2008, TarRiver.org, Available at: http://www.tarriver.org/Documents/print_conservation_options_20070420.pdf.*

"Tar River Land Conservancy—Info for Landowners", Oct. 11, 2008, Retrieved from Archive.org (http://web.archive.org/web/20081011224901/http://www.tarriver.org/conservation_options.html) on Feb. 16, 2012.*

'Life Estate' Properties I ncrease in Popularity among Nonprofit Groups Mary-Beth McLaughlin. Knight Ridder Tribune Business News. Washington: May 18, 2003. p. 1.*

Book entitled "Real Estate Gift", by James Wootton, 1 page printed from the Internet Feb. 4, 2009. http://books.google.com/books?id=jTbo8LTrHtMC&dq=real+estate+gift+wooton&printsec=frontcover&sourc e=bl&ots=6TGb9HtpOv&sig=JRsIQPyKnsslpAsc0cplCH4vSEw&hl=en&sa=X&oi=book_result&resnum=l&ct=result#PPR3,M1.

Article on electronic negotiation, by Springerlink, 3 pages printed from the Internet Feb. 4, 2009. http://www.springerlink.com/content/mk310v7tvwmn693w/.

* cited by examiner

AUTOMATED BID ASK SPREAD NEGOTIATIONS METHOD

BACKGROUND OF THE INVENTION

1. Field of the Invention

The present invention relates generally to transaction negotiating systems for producing satisfactory negotiation settlements that are stalled, and particularly to an automated bid ask spread negotiations method that combines a bargain sale strategy with the normal negotiating process.

2. Description of the Related Art

Buyers and sellers in the process of negotiating the sale of a variety of asset classes often encounter a stall in the negotiation process where it seems like the spread between the bid price and the asking price cannot be reconciled. What is needed is a unique negotiating application benefiting employers, employees, business sellers and buyers, merger and acquisition negotiators, real estate buyers and sellers, and buyers and sellers of other assets, as well as, in each case, a charity. It would be most desirable to utilize a computer process which would combine a bargain sale strategy with a normal negotiating process, the negotiator effectively adding a bonus to the package of benefits, thereby closing the gap from the previous nominal prices asked and bid, but payable to a charity of the seller's choice, over a long term and at a favorable rate of interest, and, at the same time, providing a tax deduction for seller, as well as an interest deduction for the buyer of the asset or services.

Negotiators yearn for a dramatic advance in the structural process of negotiating financial agreements. Negotiators have expressed an interest in a process that potentially could increase charitable giving by a large factor whenever negotiations involving the payment of large sums have stalled due to pricing differentials. Such a process would have a salutary effect on our economy by increasing commerce, facilitating the consummation of major financial transactions that otherwise would have failed.

Thus, a negotiating method solving the aforementioned problems is desired.

SUMMARY OF THE INVENTION

The automated bid ask spread negotiations method is a computer process and system for negotiating transactions combining a bargain sale strategy with the normal negotiating process. The system effectively adds a bonus to the package of benefits, thereby closing the gap from a previous nominal price asked and bid, but payable to a charity of the seller's choice, over a long term and at a favorable rate of interest, at the same time, providing a tax deduction for the seller, as well as an interest deduction for the buyer of the asset or services.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The automated bid ask spread negotiations method is a computer-implemented method that combines a bargain sale strategy with conventional transaction negotiations. The system effectively adds a bonus to the package of benefits, thereby closing the gap from a previous nominal price asked and bid, but payable to a charity of the seller's choice over a long term and at a favorable rate of interest, at the same time, providing a tax deduction for the seller, as well as an interest deduction for the buyer of the asset or services.

A Bargain sale to a charitable organization is the sale of property to a charitable organization at a price below fair market value. If the property has appreciated in value, you must allocate your basis between the portion of property sold and the portion of property donated. You then pay tax on any gain on the portion of property sold, and you deduct the remaining portion as a charitable contribution, subject to charitable contribution rules.

The automated bid ask spread negotiations method utilizes the aforementioned bargain sale to a charitable organization in order to bridge the spread between a buyer's bid and a seller's ask in stalled negotiations.

Figure 1:
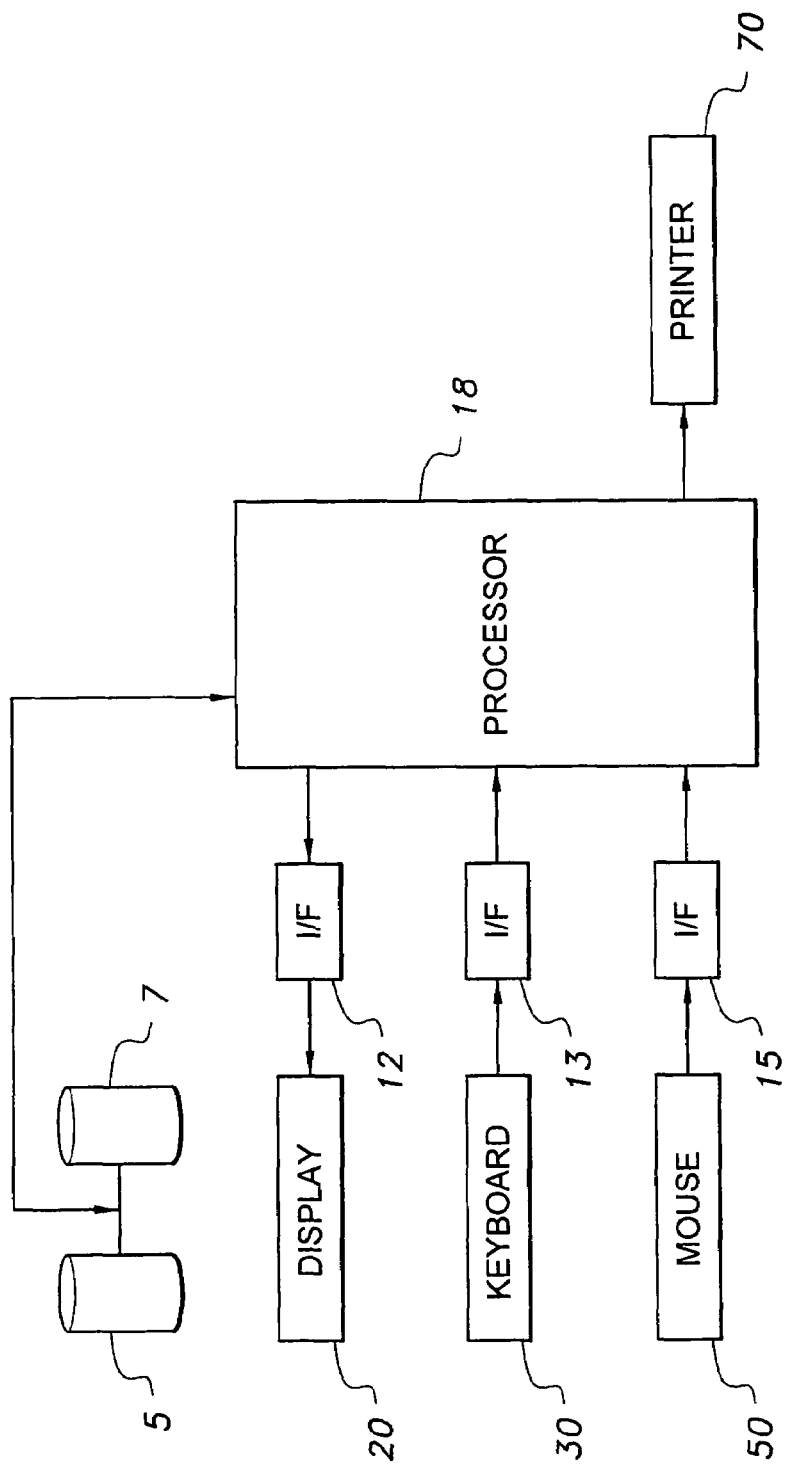
FIG. 1 is a block diagram of an exemplary computer system according to the present invention.

Steps of the automated bid ask spread negotiations method are executed by a computer 18, shown diagrammatically in FIG. 1. The computer 18 carries out various kinds of processing, including, but not limited to, accepting the input parameters from a keyboard 30 and/or mouse 50 communicating via interfaces 13 and 15. The computer 18 then stores the input data as database entries in storage device 5 for later retrieval and processing. During processing of database entries stored in storage device 5, the computer 18 solves a plurality of equations and stores the results as entries in a results database, i.e., results data storage device 7. The processor 18 can utilize the data stored in results database 7 to formulate a proposal that has a chance of advancing stalled negotiations.

The computer 18 formats and outputs the proposal to a display device 20 via interface 12 and/or to a printer 70. It is contemplated that computer 18 can advantageously process input data from a plurality of deals and thus provide solution proposals to the plurality of deals in a time frame that would be acceptable to the negotiators involved in the deals. Such a feat would be impossible for a person to keep track of and calculate, thus the computer 18 is a force multiplier in the performance of the automated bid ask spread negotiations method. The input parameters accepted by computer 18 and stored in database 5 are listed below in Table 1.

TABLE 1

| | |
|---|---|
| A | Last Price Asked |
| B | Last Price Bid |
| BTR | Buyer's Marginal Income Tax Rate |
| C | Cost Basis |
| CGR | Capital Gains Tax Rate |
| FMV | Independently Appraised Fair Market Value |
| I | 130% Applicable Federal Rate, Monthly, Long Term, as Published Monthly by IRS |

TABLE 1-continued

| | |
|---|---|
| INP | Interest Rate Buyer Normally Pays, e.g., Prime Rate Plus One |
| L22 AGI | Line 22 of Seller's IRS Form 1040 |
| STR | Seller's Marginal Income Tax Rate |

The computer processes the inputs by solving equations 1 through 8 to provide outputs that are stored as entries in database 7.

$$ACB = C - C(FMV-B)/FMV \quad (1)$$

$$G = FMV - B \quad (2)$$

$$CG = B - ACB \quad (3)$$

$$CGT = CG \times CGR \quad (4)$$

$$IC = I \times G \quad (5)$$

$$MAD \text{ (maximum annual deductible)} = 0.30 \times L22 \quad (6)$$

$$BNC = PYMT - BTS \quad (7)$$

$$OITS = G \times STR \quad (8)$$

Table 2 defines the terms described in the equations solved by computer 18.

TABLE 2

| | |
|---|---|
| ACB | Adjusted Cost Basis |
| G | Gift |
| CG | Capital Gain |
| CGT | Capital Gains Tax |
| IC | Interest Cost |
| MAD | Maximum Annual Deductible to Seller |
| BTS | Buyer's Tax Savings |
| BNC | Buyer's Net Cost After Tax Savings |
| OITS | Ordinary Income Tax Savings |
| PMT | Annual Total of Amortized Monthly, Quarterly, Semi-annual, or Annual Payments |
| PVP | Present Value of Payments |
| SNTS | Seller's Net Tax Savings |

Computer 18 calculates PVP, i.e., Present Value of Payments, using the formula for the present value of an annuity for n payment periods, but substituting the Interest Rate Buyer Normally Pays, i.e., INP.

In this case the cash flow values remain the same throughout the "n" periods. The present value of an annuity (PVA) formula has four variables, each of which can be solved for:
  PV(A) is the value of the annuity at time=0.
  A is the value of the individual payments in each compounding period.
  i is equal to the interest rate INP that would be compounded for each period of time.
  n is the number of payment periods.

$$PV(A) = \frac{A}{i} \cdot \left[1 - \frac{1}{(1+i)^n}\right] \quad (9)$$

$$SNTS = OITS - CGT \quad (10)$$

The solutions to equations 9 and 10 are also stored by processor 18 in the results database 7.

Figure 3:
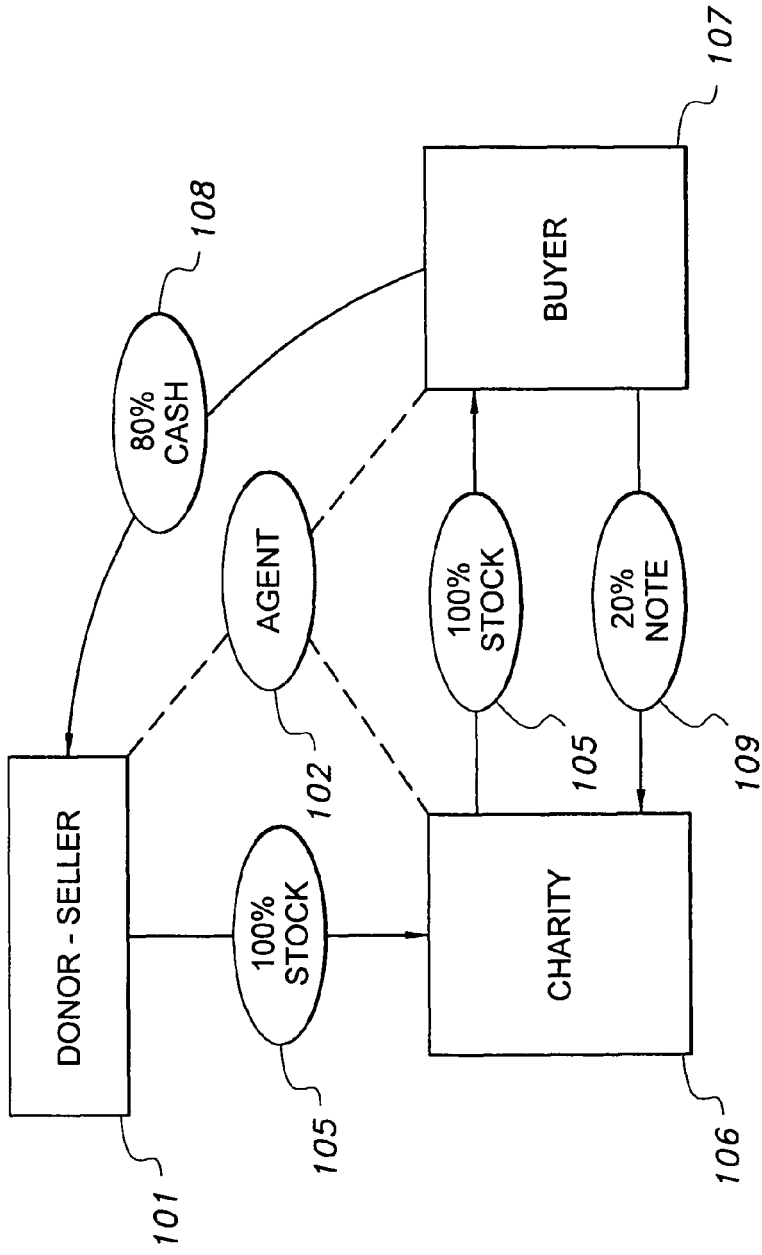
FIG. 3 is a block diagram showing a manufacturing corporation sale example according to the present invention.

In an example, of the automated bid ask spread negotiations method, consider FIG. 3, which illustrates the case of a seller 101, Bill SELLER-1, an entrepreneur who owns all the common stock of ABC Manufacturing Corporation, which he founded, and is now ready to sell so he can retire. The company has been independently appraised by a qualified business appraiser and it was determined that its fair market value (FMV) is $10 million. A qualified buyer 107, BUYER-1 Corporation, has negotiated for several months with Mr. SELLER-1 and negotiations have stalled at an $8 million bid by BUYER-1 Corporation.

Mr. SELLER-1's advisor, e.g., agent 102, has suggested that the automated bid ask spread negotiations method be implemented to resuscitate the negotiations. The automated bid ask spread negotiations method utilizes computer 18 to process the input data described in Table 1 and a user determinable interest rate scenario, the output of said processing being at least one proposal that Mr. SELLER-1 can present to the buyer pursuant to the bargain sale rules of the Internal Revenue Code. The proposal is based on the results stored in database 7 from calculations of equations 1 through 10 performed by processor 18.

An exemplary proposal generated by the automated bid ask spread negotiations method includes a scenario in which Mr. SELLER-1 will offer to his favorite charity 106, which he has long admired, the right/option to purchase the common stock 105 at a bargain sale price of $8 million along with his $2 million charitable gift of the excess of the stock's FMV over the $8 million bargain sale price. Concurrently upon closing, the charity would, at its option, offer to sell all the ABC Manufacturing Corporation common stock 105 to BUYER-1 Corporation, for its FMV of $10 million, but payable $8 million in cash 108, which would be remitted to Mr. SELLER-1; plus $2 million to be paid by BUYER-1 Corporation directly to the charity 106, monthly under a 5%, 20-year amortization schedule secured by BUYER-1 Corporation's promissory note 109 in favor of the charity 106.

In addition to receiving 80% of the fair market value, Mr. SELLER-1 could claim a $2 million deduction against his ordinary income, for tax purposes, equal to 20% of the appraised fair market value of the common stock, which tax deduction, if not fully used in the first year, could be carried forward for up to five more years, under the IRS bargain sale rules. It should be understood that gift portion percentages are exemplary only, and may vary on a case-by-case basis.

Mr. SELLER-1 benefits by closing the gap above the previously stalled purchase offer, obtaining an immediate tax deduction equal to the size of the gift portion to offset his other ordinary income, incurring no ordinary income tax on the gift portion, and due to the charitable contribution of the gift portion, receiving the immeasurable satisfaction that comes from contemplating the difference his gift to charity will make in the lives of people, and making the world a better place because of his contribution.

The BUYER-1 Corporation benefits by being able to stretch the payment for the amount of the previously unresolved negotiating gap (the spread) over many years at a favorable rate of interest.

The charity 106 achieves the benefit of receiving, with virtually no fundraising expense, a dependable long term stream of cash income, guaranteed by BUYER-1 Corporation, to help offset the cost of fulfilling their exempt purposes. Additionally, the salutary effect of challenging the BUYER-1 as well as the SELLER-1 to see this through to completion because a charity is involved must not be overlooked.

Because the agreement of sale to the ultimate buyer may, in some cases, be executed by the donor 101 and not by the charity 106, the IRS would, in that event, likely regard it as a step transaction, and the donor 101, i.e., SELLER-1 would be responsible to pay capital gains tax on the gift portion as well. Nonetheless, the gift portion will concurrently generate a deduction against ordinary income, and yield savings at a much higher tax rate. The method may utilize the lowest possible Long Term Applicable Federal Rate (AFR), as published monthly by the IRS, without incurring an imputed rate of interest, in order to (based on an exemplary, April 2009, 130% of AFR rate of 4.68%) amortize $2,000,000 with 360 equal consecutive monthly payments of $10,348.72. However, for the sake of analysis, by applying 8% per annum as the buyer's interest normally paid (INP) and being its otherwise current cost of capital, the Present Value of Payments (PVP) would calculate to be only $1,410,360.78.

This has the salutary effect of ameliorating the perceived cost for the buyer; while at the same time, the seller's tax savings will ameliorate the difference from the asking price obtained by the seller. These two benefits help to close the negotiating gap. Moreover, the final $2,000,000 increment of funding will not require collateral to be pledged, because the note to the charity will be unsecured. This alone could open up funding possibilities from outside sources who only want to finance, say 80% of a transaction but want 100% of the asset pledged as collateral, such as in the case of a typical real estate mortgage loan.

Figure 2:
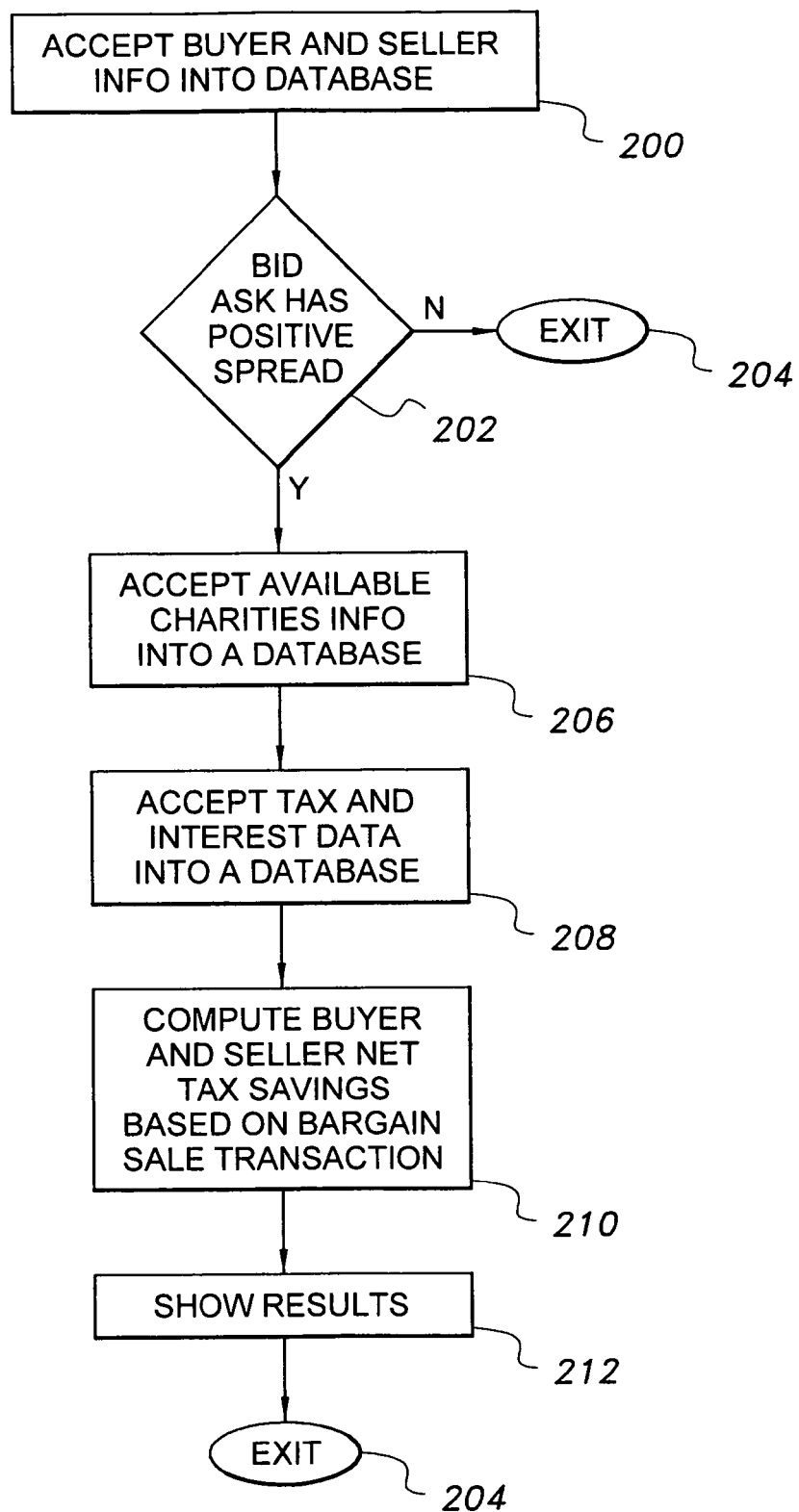
FIG. 2 is a flow diagram showing method steps according to the present invention.

As shown in FIG. 2, the procedural steps of the automated bid ask spread negotiations method are sufficiently general to encompass a variety of situations other than the aforementioned example. Generally, buyer and seller information is accepted into a database at step 200. A negotiations spread is calculated at step 202, and if the bid is equal to the ask, or if there is an overbid, the procedure exits at step 204, otherwise processing continues at step 206 in which available charities information is accepted into a database. At step 208 tax and interest data are accepted into the database. At step 210 buyer and seller net tax savings are computed based on a bargain sale transaction. At step 212 the results scenarios are presented to the user via display device 20 or printer 70.

Figure 4:
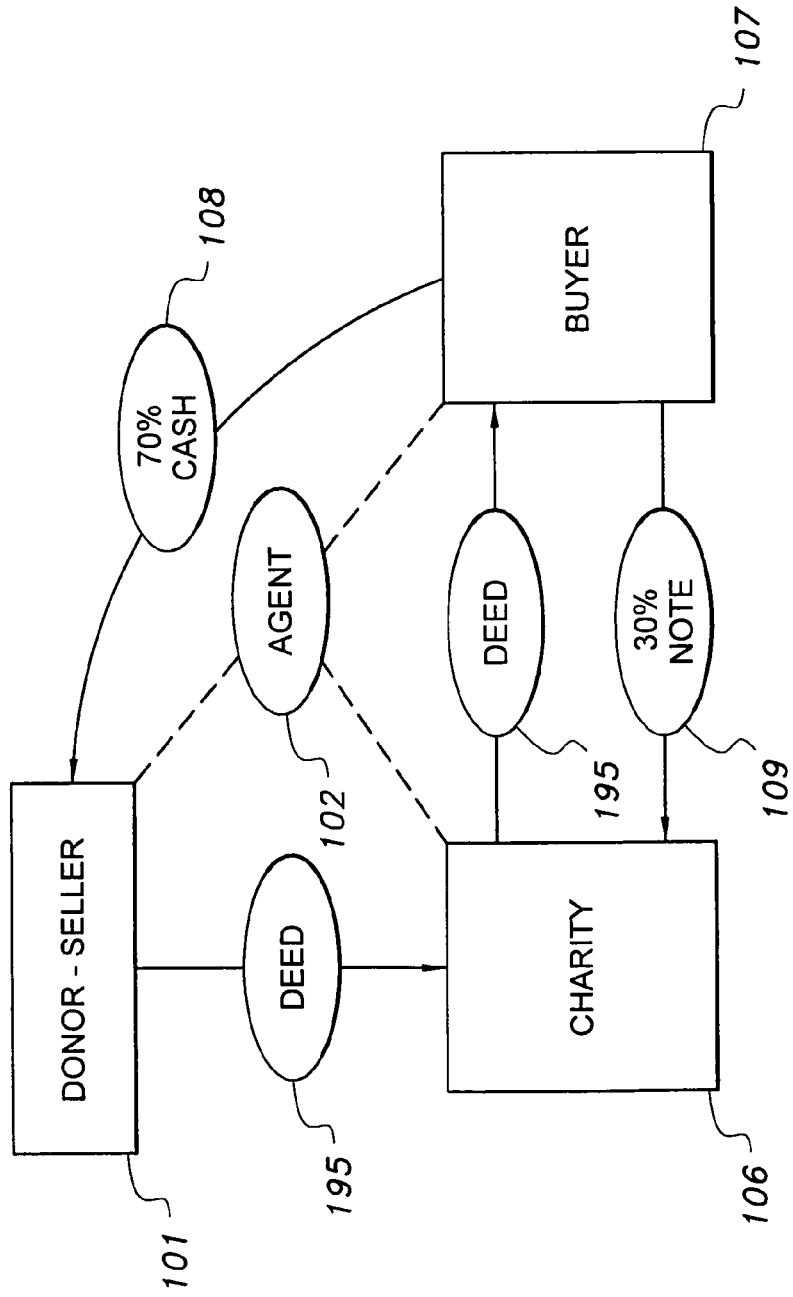
FIG. 4 is a block diagram showing a real estate sale example according to the present invention.

In another example, shown in FIG. 4, consider the case wherein the donor-seller 101 is Sam SELLER-2, a real estate investor, who desires to sell a shopping center and his family farm which he has owned for many years and which have appreciated greatly in value. The shopping center and the family farm have been independently appraised by an independent qualified commercial real estate appraiser and it was determined that the fair market value for all the real estate is $5 million. A qualified buyer 107, Tom BUYER-2, has negotiated for several months with Mr. SELLER-2 and negotiations have stalled at a $3.5 million bid by Mr. BUYER-2. Mr. SELLER-2's advisor 102 has suggested that the automated bid ask spread negotiations method be implemented to resuscitate the negotiations.

The automated bid ask spread negotiations method utilizes computer 18 to process the input data described in Table 1 and a user determinable interest rate scenario, the output of said processing being at least one proposal that Mr. SELLER-1 can present to the buyer pursuant to the bargain sale rules of the Internal Revenue Code. The proposal is based on the results stored in database 7 from calculations of equations 1 through 10 performed by processor 18. An exemplary proposal generated by the automated bid ask spread negotiations method includes a scenario in which Mr. SELLER-2 can offer to his favorite charity 106, in which he has long been an annual significant donor, the right to purchase the shopping center by general warranty deed 195, free and clear of all mortgages and liens at a bargain sale price of $3.5 million along with his $1.5 million charitable gift of the excess of the FMV over the $3.5 million bargain sale price.

Concurrently upon closing, the charity 106 would, at its option, offer to sell the real estate to Mr. BUYER-2 for its FMV of $5 million, but payable $3.5 million in cash 108, which would be remitted to Mr. SELLER-2; plus $1.5 million to be paid by Mr. BUYER-2 directly to the charity 106, monthly under a 5%, 20-year amortization schedule secured by Mr. BUYER-2's promissory note 109 in favor of the charity 106. In addition to receiving 70% of the fair market value, the seller could claim a $1.5 million deduction against his ordinary income, for tax purposes, equal to 30% of the appraised fair market value of the shopping center, which tax deduction, if not fully used in the first year, could be carried forward for up to five more years, under the IRS bargain sale rules.

As seller 101, Mr. SELLER-2 benefits by closing the gap above the previous offer, obtaining an immediate tax deduction equal to the size of the gift portion to offset his other ordinary income, incurring no ordinary income tax on the gift portion, and due to the charitable contribution of the gift portion, receiving the immeasurable satisfaction that comes from contemplating the difference his gift to charity will make in the lives of people, and making the world a better place because of his contribution.

As buyer 107, Mr. BUYER-2 benefits by being able to stretch the payment for the amount of the previously unresolved negotiating gap over many years at a favorable rate of interest.

The charity 106 achieves a benefit in that it receives, with virtually no fundraising expense, a dependable long term stream of cash income, guaranteed by Mr. BUYER-2, to help offset the cost of fulfilling their exempt purposes, to the ultimate benefit of society.

The automated bid ask spread negotiations method facilitates all the foregoing through the input of the data described in TABLE 1 for processing by computer 18, storing results in database 7, determining the feasibility of the transaction, and outputting feasible proposals to display device 20 and/or printer 70 for evaluation by the decision makers.

Because the agreement of sale to the ultimate buyer may, in some cases, be executed by the donor 101 and not by the charity 106, the IRS would, in that event, likely regard it as a step transaction, and the donor 101 would be responsible to pay capital gains tax on the gift portion as well. Nonetheless, the gift portion will concurrently generate a deduction against ordinary income, and yield savings at a much higher tax rate.

Figure 5:
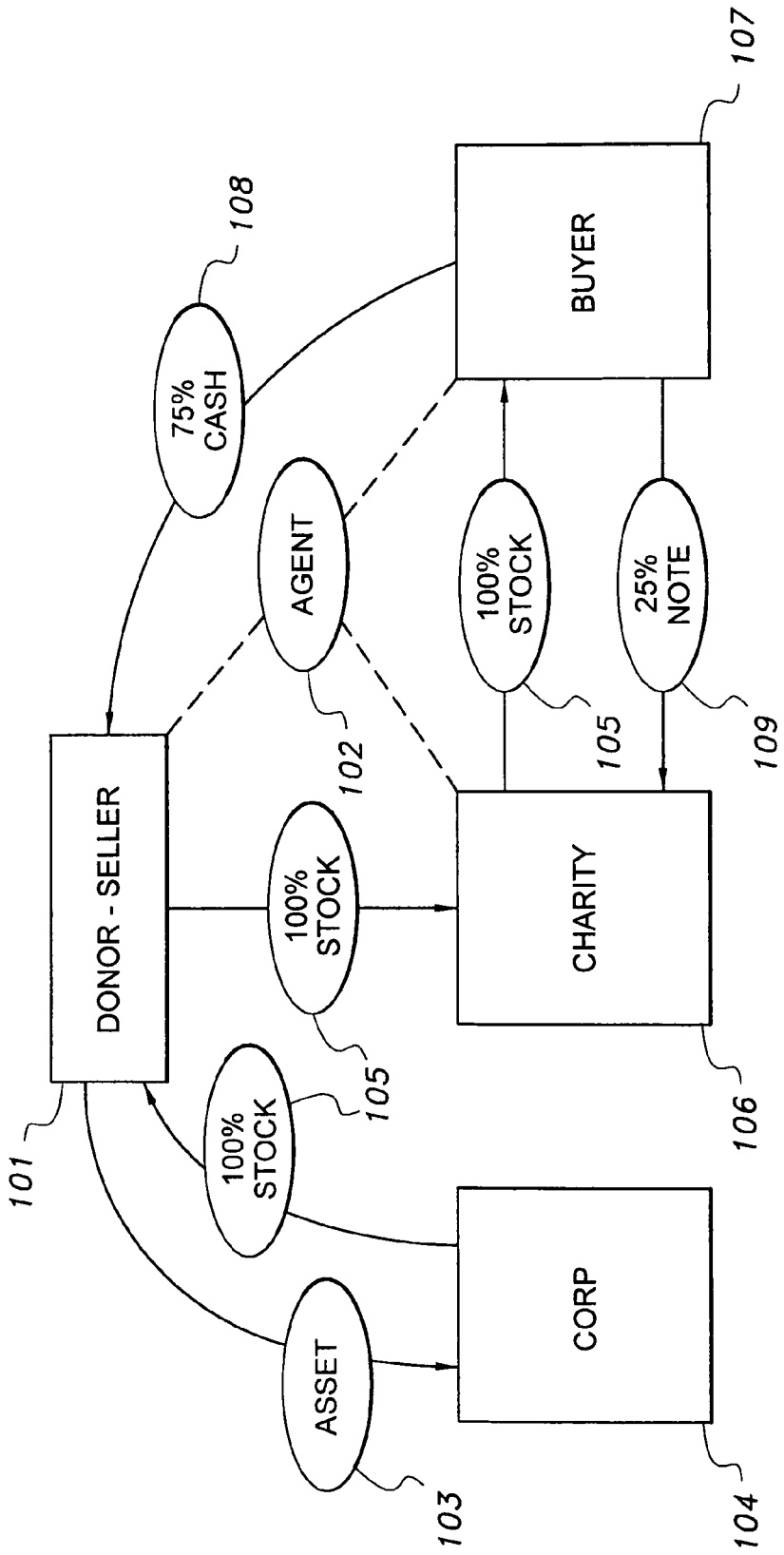
FIG. 5 is a block diagram showing a personal services sale example according to the present invention.

In yet another example, as shown in FIG. 5, consider the case wherein the donor-seller 101 is John Jones, a professional sports athlete, who, as a prospective employee, had been in negotiations with a buyer 107 who is a major league team seeking to employ the services of the seller-donor 101, by offering the seller-donor 101 a multi-year employment contract. But negotiations have stalled over the amount of compensation. The advisor 102 suggests the Charitable Negotiating Bonus Plan, i.e., the automated bid ask spread negotiations method.

According to the method, the donor-seller 101 organizes a new for-profit corporation 104, Jones Company, purchasing at the outset for cash all of its outstanding stock 105, and timely filing with IRS form 83(b) within 30 days. Thereafter, he executes a multi-year contract to provide his full time service 103 to the corporation 104. An independent qualified appraiser ascertains the fair market value of 100% of Jones Company common stock, predicated on Mr. Jones providing full time service as an employee for the same multi-year period.

With donative intent, the donor-seller 101 agrees to grant an option to his long time favorite charity 106, an unaffiliated non-profit public charitable organization, duly qualified and operating as a 501(c)(3) organization, as determined by the IRS, so that the charity 106 would have the right to acquire all common stock 105 of the corporation 104 from the donor-seller 101 under the IRS bargain sale rules. A bargain sale is part gift and part sale.

To illustrate, the donor-seller 101 would receive for the stock, 75% of the appraised fair market value, payable in equal monthly installments 108 over the same term as the multi-year employment contract 103, and the remainder of the stock's fair market value, 25%, would be a charitable gift from the donor-seller 101, i.e., PRINCIPAL, to the charity 106. Simultaneously upon closing the transaction, the charity 106 would sell 100% of the Jones Company stock 105 to the employer/buyer 107, and receive for the stock 105 an amount equal to (a) 75% of the fair market value payable at the charity's direction and to be remitted from the outset and without recourse, directly to Mr. Jones, subject to federal, state and local income taxes, in monthly installments 108 over the same term as the multi-year employment contract, and (b) 25% of the fair market value payable directly to the charity and to be retained by the charity, under a 5%, 20-year amortization schedule, secured by employer/buyer's promissory note 109.

In addition to receiving 75% of the fair market value, the donor-seller 101 could claim a deduction against his ordinary income, for tax purposes, equal to 25% of the appraised fair market value, which tax deduction, if not fully used in the first year, could be carried forward for up to five more years, under the IRS bargain sale rules.

The donor-seller 101 benefits by closing the gap above the previous compensation offer, obtaining an immediate tax deduction equal to the size of the gift portion to offset his other ordinary income, incurring no ordinary income tax on the gift portion, and due to the charitable contribution of the gift portion, receiving the immeasurable satisfaction that comes from contemplating the difference his gift to charity will make in the lives of people, and making the world a better place because of his contribution.

The EMPLOYER, i.e., buyer 107 achieves a benefit by being able to stretch the payment for the amount of the previously unresolved compensation gap over many years at a favorable rate of interest.

The charity 106 benefits because it receives, with virtually no fundraising expense, a dependable long-term stream of cash income guaranteed by the EMPLOYER.

Because the agreement of sale to the ultimate buyer may, in some cases, be executed by the donor 101 and not by the charity 106, the IRS would, in that event, likely regard it as a step transaction, and the donor 101 would be responsible to pay capital gains tax on the gift portion as well. Nonetheless, the gift portion will concurrently generate a deduction against ordinary income, and yield savings at a much higher tax rate.

Figure 6:
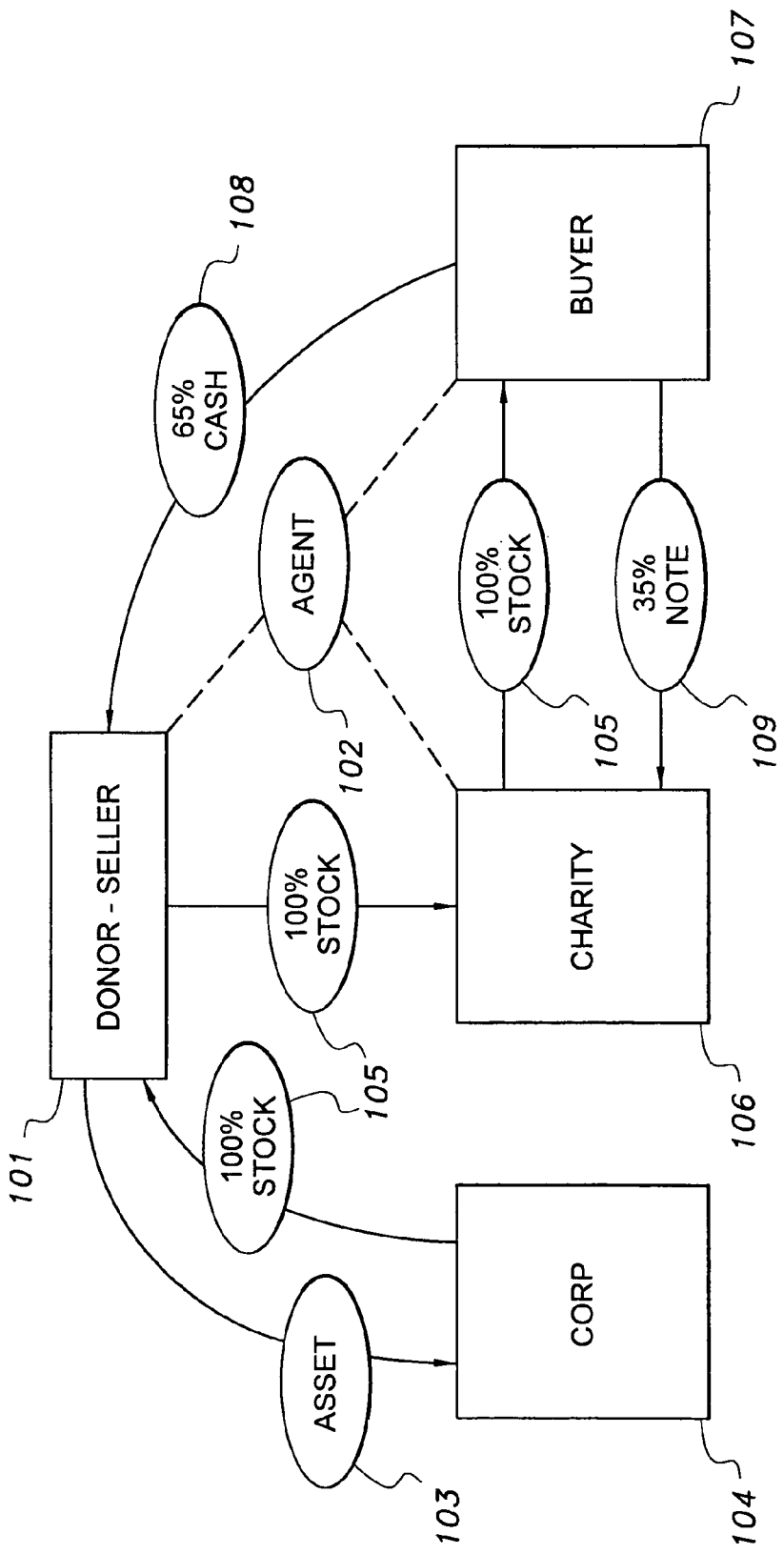
FIG. 6 is a block diagram showing a chose in action sale example according to the present invention.

As shown in FIG. 6, consider the case wherein the donor-seller 101 is a plaintiff, who, through legal counsel, had been in negotiations with a defendant to settle a $4 million lawsuit. But negotiations have stalled over the amount of the settlement. Under the automated bid ask spread negotiations method; the PLAINTIFF organizes a new for-profit settlement corporation 104, assigning all of plaintiff's interest in his chose in action to the settlement corporation 104. An independent qualified appraiser ascertains the fair market value of 100% of Settlement Corporation common stock 105, predicated on the value of the chose in action 103 owned by Settlement Corporation 104. With donative intent, the PLAINTIFF 101 agrees to grant an option to his long time favorite charity, an unaffiliated non-profit public charitable organization 106, duly qualified and operating as a 501(c)(3) organization, as determined by the IRS, so that the charity 106 would have the right to acquire 100% of Settlement Corporation common stock 105 from the PLAINTIFF 101 under the IRS bargain sale rules.

A bargain sale is part gift and part sale. To illustrate, the PLAINTIFF 101 would receive cash 108 for the stock in the amount of 65% of the appraised fair market value, payable same terms as the terms of settlement, pro rata, and the remainder of the stock's fair market value, 35%, would be a charitable gift from the PLAINTIFF, i.e., donor-seller 101 to the charity 106. Simultaneously upon closing the transaction, the charity 106 would sell 100% of the Settlement Corporation stock 105 to the DEFENDANT, and receive for the stock an amount equal to (a) 65% of the fair market value payable at the charity's direction and to be remitted from the outset directly and without recourse, to the donor-seller 101, i.e., plaintiff, under the same terms as the settlement; and (b) 35% of the fair market value payable directly to the charity 106 and to be retained by the charity, under a 5%, 20-year amortization schedule, secured by a promissory note 109.

In addition to receiving 65% of the fair market value, the PLAINTIFF 101 could claim a deduction against his ordinary income, for tax purposes, equal to 35% of the appraised fair market value, which tax deduction, if not fully used in the first year, could be carried forward for up to five more years, under the IRS bargain sale rules.

The PLAINTIFF 101 benefits by closing the gap above the previous settlement offer, obtaining an immediate tax deduction equal to the size of the gift portion to offset his other ordinary income, and due to the charitable contribution of the gift portion, receiving the immeasurable satisfaction that comes from contemplating the difference his gift to charity will make in the lives of people, and making the world a better place because of his contribution.

The DEFENDANT, i.e., buyer 107 achieves the benefit of being able to stretch the payment for the amount of the previously unresolved compensation gap (bid-ask spread) over many years at a favorable rate of interest.

The charity 106 benefits from receiving, with virtually no fundraising expense, a dependable long term stream of cash income which is guaranteed by the DEFENDANT 107, to help offset the cost of fulfilling their exempt purposes, to the ultimate benefit of society.

Because the agreement of sale to the ultimate buyer may, in some cases, be executed by the donor 101 and not by the charity 106, the IRS would, in that event, likely regard it as a step transaction, and the donor would be responsible to pay capital gains tax on the gift portion as well. Nonetheless, the gift portion will concurrently generate a deduction against ordinary income, and yield savings at a much higher tax rate.

Moreover, it should be understood that the automated bid ask spread negotiations method can also be applied to sales negotiations involving the sale (including auction sale) of personal property that has been appraised at a current fair market value of less than the owner's cost, and having a proposed buyer bid at even less than the depressed appraised value. In such an instance, the spread is compensated for in the same manner as described in the aforementioned examples.

It is to be understood that the present invention is not limited to the embodiment described above, but encompasses any and all embodiments within the scope of the following claims.

I claim:

1. A computer software product, comprising a non-transitory computer readable storage, medium readable by a processor, the non-transitory computer readable storage medium having stored thereon a set of instructions for automating a deal to advance stalled negotiations having a bid ask spread, the set of instructions including:

a first set of instructions causing the processor to store in a database buyer and seller information regarding at least one stalled transaction in a bid ask negotiation wherein the bid ask negotiation has a positive spread;

a second set of instructions causing the processor to store in the database information relating to charitable entities that may receive financial benefits as a result of bridging the spread to complete the transaction;

a third set of instructions causing the processor to determine and store in the database the fair market value of the asset being sold;

a fourth set of instructions causing the processor to formulate an offer to at least one of the charitable entities the option to purchase the asset from the seller at a bargain sale price;

a fifth set of instructions causing the processor to formulate a charitable contribution from the seller to the charity in the amount of the spread between the bargain sale price and the FMV;

a sixth set of instructions causing the processor to formulate a deal in the form of an option exercisable by the charity to sell the asset to the buyer at the FMV price of the asset, payable in cash at the bid price;

a seventh set of instructions causing the processor to formulate the deal to cause said bid price to be remitted by the buyer to the seller, said spread amount to be remitted by the buyer to the charity payable at a predetermined period under a predetermined interest rate over a predetermined amortization schedule, said spread payment obligation to be secured by a promissory note from the buyer in favor of the charity;

and an eighth set of instructions causing the processor to display the deal to the charity, the buyer, and the seller.

2. The computer software product according to claim 1, further comprising:

a ninth set of instructions causing the processor to compute a seller's net tax savings resulting from the deal;

a tenth set of instructions causing the processor to store the seller's net tax savings in the database;

and an eleventh set of instructions causing the processor to display the seller's net tax savings to the user.

3. The computer software product according to claim 1, further comprising:

a twelfth set of instructions causing the processor to compute a buyer's tax savings resulting from the deal;

a thirteenth set of instructions causing the processor to store the buyer's tax savings in the database;

and a fourteenth set of instructions causing the processor to display the buyer's tax savings to the user.

4. The computer software product according to claim 1, further comprising:

a fifteenth set of instructions causing the processor to compute a buyer's net cost after tax savings resulting from the deal;

a sixteenth set of instructions causing the processor to store the buyer's net cost after tax savings in the database; and a seventeenth set of instructions causing the processor to display the buyer's net cost after tax savings to the user.

5. The computer software product according to claim 1, wherein the asset being sold is selected from the group consisting of real property, personal property, personal services, and a chose in action.

* * * * *